United States Patent [19]
Pedneau

[11] Patent Number: 5,566,312
[45] Date of Patent: Oct. 15, 1996

[54] PROCESSIMG UNIT WITH PROGRAMMABLE MIS-ALIGNED BYTE ADDRESSING

[75] Inventor: Michael D. Pedneau, Austin, Tex.

[73] Assignee: Advanced Micro Devices, Sunnyvale, Calif.

[21] Appl. No.: 247,247

[22] Filed: May 23, 1994

[51] Int. Cl.⁶ .................................................. G06F 12/04
[52] U.S. Cl. ............................................................ 395/411
[58] Field of Search ..................... 395/427, 481, 395/494, 410, 421.07, 411; 364/DIG. 1, DIG. 2

[56] References Cited

U.S. PATENT DOCUMENTS 5,170,477  12/1992  Potter et al. ........................... 395/425

FOREIGN PATENT DOCUMENTS 0076155  4/1983  European Pat. Off. .
0322880  7/1989  European Pat. Off. .

OTHER PUBLICATIONS

Huang, V. K. L., et al., "The AT&T WE32200 Design Challenge", *IEEE Micro.*, (Apr. 1, 1989), vol. 9, No. 2, pp. 14–24.

Primary Examiner—David L. Robertson
Attorney, Agent, or Firm—B. Noel Kivlin

[57] ABSTRACT

A processing unit is provided that generates an address signal which specifies data on a per-byte basis and that further generates a set of byte enable signals which specify enabled bytes relative to the addressed byte. Both the byte enable signals and the address signal are provided to a memory control unit. The processing unit can thereby generate a single memory access to a misaligned memory address, while still specifying a variable number of enabled bytes. A control input provided to the processing unit controls whether a bus control unit of the processing unit generates single cycle memory accesses to misaligned addresses or two-cycle memory accesses to misaligned addresses. For memory accesses to static RAM, the memory control unit may deassert the control signal such that the processing unit generates two-cycle accesses on misaligned addresses. On the other hand, for memory accesses to dynamic RAM, the memory control unit may assert the control signal such that the processing unit generates single cycle accesses on misaligned addresses, unless a page boundary is encountered. The processing unit advantageously allows single cycle accesses to misaligned addresses to thereby accommodate increased system performance, and further supports broad compatibility with existing memory systems.

20 Claims, 4 Drawing Sheets

PROCESSIMG UNIT WITH PROGRAMMABLE MIS-ALIGNED BYTE ADDRESSING

BACKGROUND OF THE INVENTION

1. Field of the Invention

This invention relates to computer systems and more particularly to memory addressing mechanisms and techniques employed within computer systems.

2. Description of the Relevant Art

Computer systems based on the particularly popular model 80486 microprocessor allow memory accesses on a per-byte basis. Within 80486 based systems, one byte of data comprises 8-bits. Since the data bus of the model 80486 has a width of 32-bits, it is possible to transfer a total of four bytes of data at a time. A given combination of four bytes of data transferrable simultaneously on the data bus are referred to as a "doubleword". A set of address signals from the microprocessor are used to select the doubleword being referenced during a particular bus cycle, and four byte enable signals are provided to indicate the particular bytes of the addressed doubleword that are valid during the cycle.

FIG. 1 illustrates a block diagram of a portion of a typical model 80486-based computer system 100. The computer system 100 of FIG. 1 includes a memory controller 102 coupled to a microprocessor (CPU) 104 and a system memory 106. Microprocessor 104 includes an execution core 110 that implements a predetermined instruction set and a bus control unit 112 that controls the generation of a local bus address signal labeled LA[31:2] and a byte enable signal BE[3:0].

System memory 106 is illustrative of a static RAM or a dynamic RAM memory subsystem. Memory control unit 102 orchestrates the transfer of data, address, and control signals between microprocessor 104 and system memory 106.

Internally, execution core 110 of microprocessor 104 generates an addressing signal A[31:0] which specifies memory locations on a per-byte basis during memory access cycles. Since execution core 110 is capable of generating single-byte memory bus cycles, two byte memory bus cycles, or four-byte memory bus cycles, the execution core 110 also generates a memory size signal labeled MEMSIZE [1:0] which indicates the number of bytes to be accessed during execution of a given cycle. In response to an internal memory access cycle, bus control unit 112 controls the generation of the local bus address signal LA[31:2] to specify the particular doubleword(s) being accessed. The bus control unit 112 further decodes the two lower-order addressing signals A[1:0] and the MEMSIZE[1:0] signal to generate an appropriate byte enable signal BE[3:0]. The byte enable signal BE[3:0] specifies the bytes within the particular addressed doubleword that are enabled during a particular memory cycle. The memory control unit 102 correspondingly monitors the local bus address signal LA[31:2] and the byte enable signal BE[3:0] during operation to generate appropriate address control signals on the memory bus to access system memory 106.

For the computer system of FIG. 1, the generation of an internal memory reference by execution core 110 that results in a "misaligned memory access" requires two external memory cycles by control unit 112. A misaligned memory access exists when a memory cycle is generated by execution core 110 that requires the transfer of selected bytes of different consecutive doublewords, as defined by the memory mapping of the particular system. Two external memory cycles are required to execute an instruction involving a misaligned memory address since the address signal LA[31:2] as generated by bus control unit 112 is only capable of specifying a single doubleword at a time, with the byte enable signals specifying the particular bytes of the addressed doubleword. For example, consider a situation in which an instruction is encountered by execution core 110 to write four bytes of data starting at the byte address location 003:H (i.e., A[31:0] =003:H). FIG. 2A illustrates the external local bus cycles generated by bus control unit 112 during the execution of such a cycle. FIG. 2B is an exemplary memory map that illustrates the apparent segregation of doublewords (along with the constituent bytes of each) within system memory 106. It is noted that each doubleword is segregated in accordance with the local bus address signal LA[31:2]. That is, the local bus address signal LA[31:2] specifies a particular doubleword location of system memory 106. Each row of the memory map of FIG. 2B represents a separate doubleword location, and each row is divided into four sections which are representative of the separate bytes of each doubleword. It is noted that each byte location is indirectly specified by the internal address signal A[31:0], but cannot be individually specified by the local bus address signal LA[31:2] (i.e., byte 3 of doubleword LA[31:2] =000:H corresponds to byte address location A[31:0] =003H).

As illustrated within FIGS. 2A and 2B, to effectuate a requested operation involving a write of four bytes of data (labelled bytes "A", "B", "C" and "D") starting at address location A[31:0] =003:H, bus control unit 112 drives the local bus address signal LA[31:2] with a value of 001:H during a first bus cycle 202. Bus control unit 112 simultaneously drives the byte enable signals BE[3:0] with a value of 1000:B, and asserts appropriate control signals to effectuate a memory write cycle. The bus control unit 112 further causes the three bytes of data (byte "B", byte "C", and byte "D") to be appropriately driven on data lines D[23:0]. The data is thereby written into the three lower-order byte locations of the addressed doubleword (i.e., LA[31:2] =001:H). During a subsequent bus cycle 204, bus control unit 112 drives the local bus address lines A[31:2] with a value of 000:H, and simultaneously drives the byte enable signals BE[3:0] with a value of 0111:B. Upon this cycle, byte "A" is driven on data lines [24:31] by bus control unit 112 and is written into the highest-order byte location of the doubleword LA[31:2] =000:H. Thus, as illustrated within FIG. 2B, the three lower-order bytes of the doubleword address location 001:H are written with valid data during the first memory cycle, and the highest-order byte of doubleword address location 000:H is written with valid data during the second memory cycle. As a result, the four bytes of data "A", "B", "C", and "D" are ultimately written to system memory 106 starting at the byte address location A[31:0] =003H.

Unfortunately, the requirement of executing two memory cycles when a memory access on a misaligned byte boundary occurs increases the time required to complete the instruction and reduces the bandwidth of the local bus. As a result, overall performance of the computer system may be degraded.

SUMMARY OF THE INVENTION

The problems outlined above are in large part solved by a processor with a programmable byte-alignment mechanism in accordance with the present invention. In one embodiment, a processing unit is provided that generates an address signal which specifies data on a per-byte basis and that further generates a set of byte enable signals which specify enabled bytes relative to the addressed byte. Both the byte enable signals and the address signal are provided to a memory control unit. The processing unit can thereby generate a single memory access to a misaligned memory address, while still specifying a variable number of enabled bytes. A control input provided to the processing unit controls whether a bus control unit of the processing unit generates single cycle memory accesses to misaligned addresses or two-cycle memory accesses to misaligned addresses. For memory accesses to static RAM, the memory control unit may deassert the control signal such that the processing unit generates two-cycle accesses on misaligned addresses. On the other hand, for memory accesses to dynamic RAM, the memory control unit may assert the control signal such that the processing unit generates single cycle accesses on misaligned addresses, unless a page boundary is encountered. The processing unit advantageously allows single cycle accesses to misaligned addresses to thereby accommodate increased system performance, and further supports broad compatibility with existing memory systems.

Broadly speaking, the present invention contemplates a processing unit comprising an execution core capable of executing a predetermined instruction set and a bus control unit coupled to the execution core, wherein the bus control unit is capable of generating an address signal, a byte enable signal, and at least one control signal for controlling a memory control unit. The control unit receives a misaligned byte support signal whereby the address signal specifies a doubleword address when the misaligned byte support signal is deasserted and wherein the address signal specifies a byte address when the misaligned byte support signal is asserted. The bus control unit is further capable of executing single cycle accesses to a misaligned doubleword address when the misaligned byte support signal is asserted.

The present invention further contemplates a processing unit comprising an execution core capable of executing a predetermined instruction set and a bus control unit coupled to the execution core. The bus control unit is capable of generating an address signal, a byte enable signal, and at least one control signal for controlling a memory control unit. A value of the address signal selectively identifies an individual byte location and wherein the byte enable signal is indicative of a number of valid bytes relative to the individual byte location that are enabled during a designated memory cycle.

The present invention finally contemplates a method for generating memory access cycles within a processing unit comprising the steps of determining a byte address of a requested memory transfer, determining the number of bytes involved in the memory transfer, and detecting a misaligned byte support signal. If the misaligned byte support signal is deasserted, the method further comprises the step of executing a two-cycle access to a misaligned doubleword address, or if the misaligned byte support signal is asserted, the method further comprises the step of executing a single cycle access to a misaligned doubleword address.

BRIEF DESCRIPTION OF THE DRAWINGS

Other objects and advantages of the invention will become apparent upon reading the following detailed description and upon reference to the accompanying drawings in which.

Figure 1:
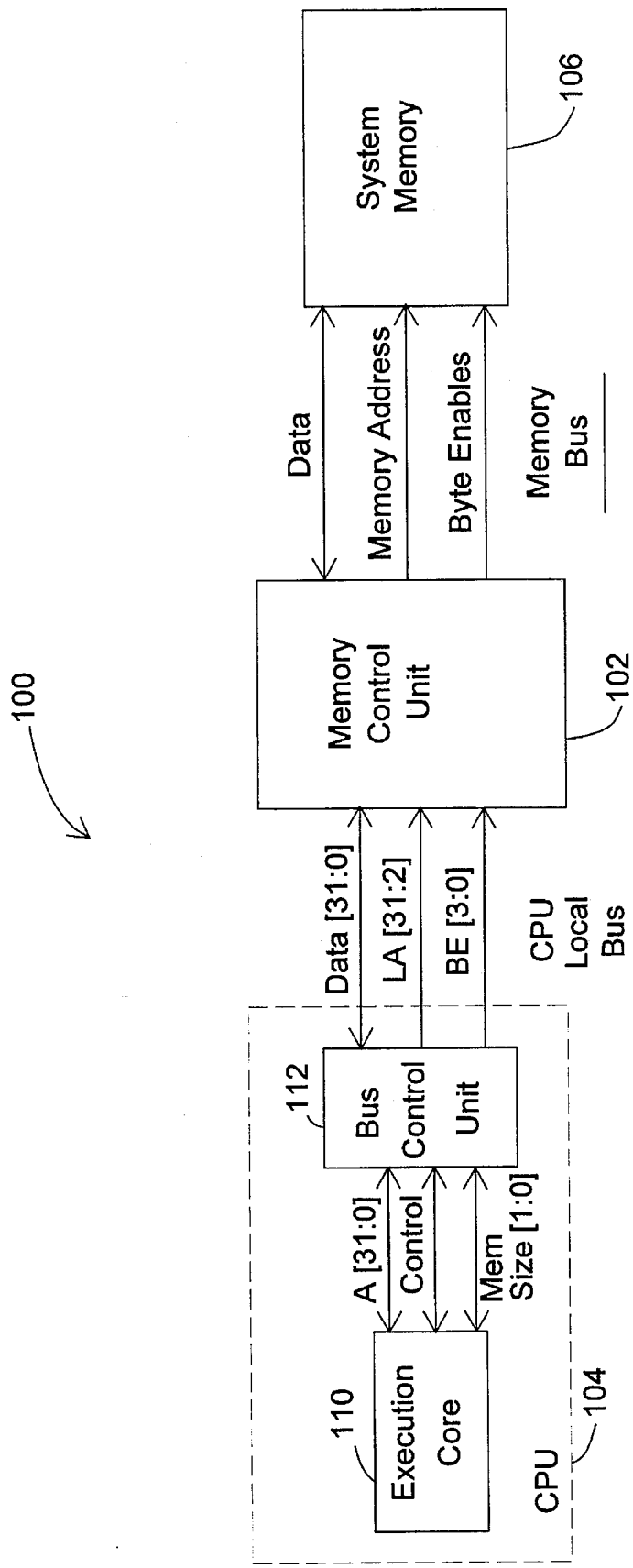
FIG. 1 is a block diagram of a portion of a typical model 80486-based computer system.
Figure 2A:
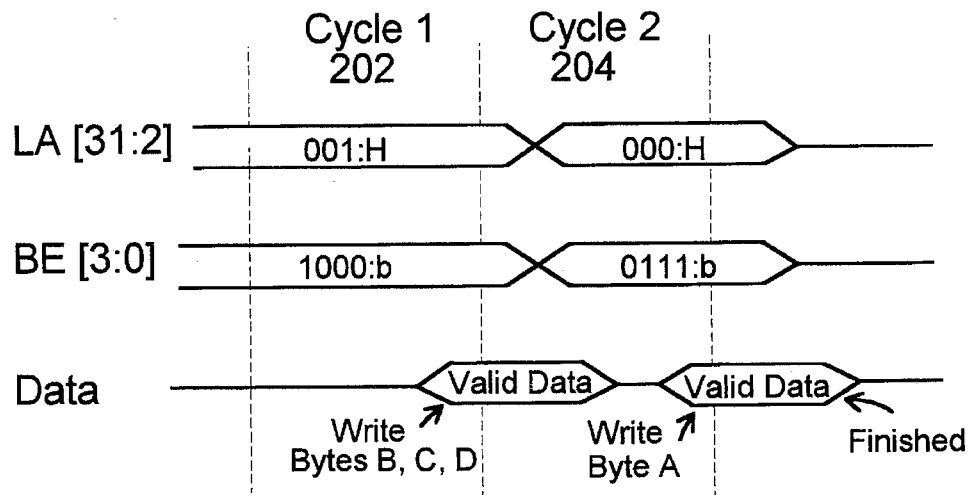
FIG. 2A is a signal diagram that illustrates the external bus cycles generated by the microprocessor of FIG. 1 during execution of an instruction to a misaligned memory address.
Figure 2B:
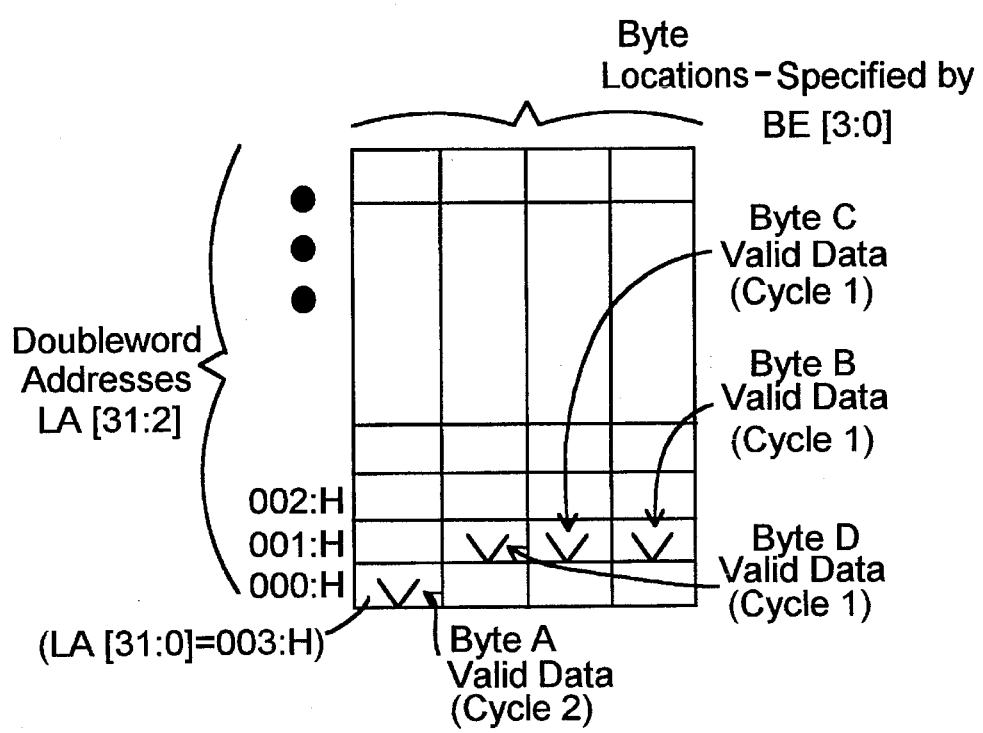
FIG. 2B is a diagram of a memory map that illustrates the writing of valid data during the execution of an instruction to a misaligned memory address.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
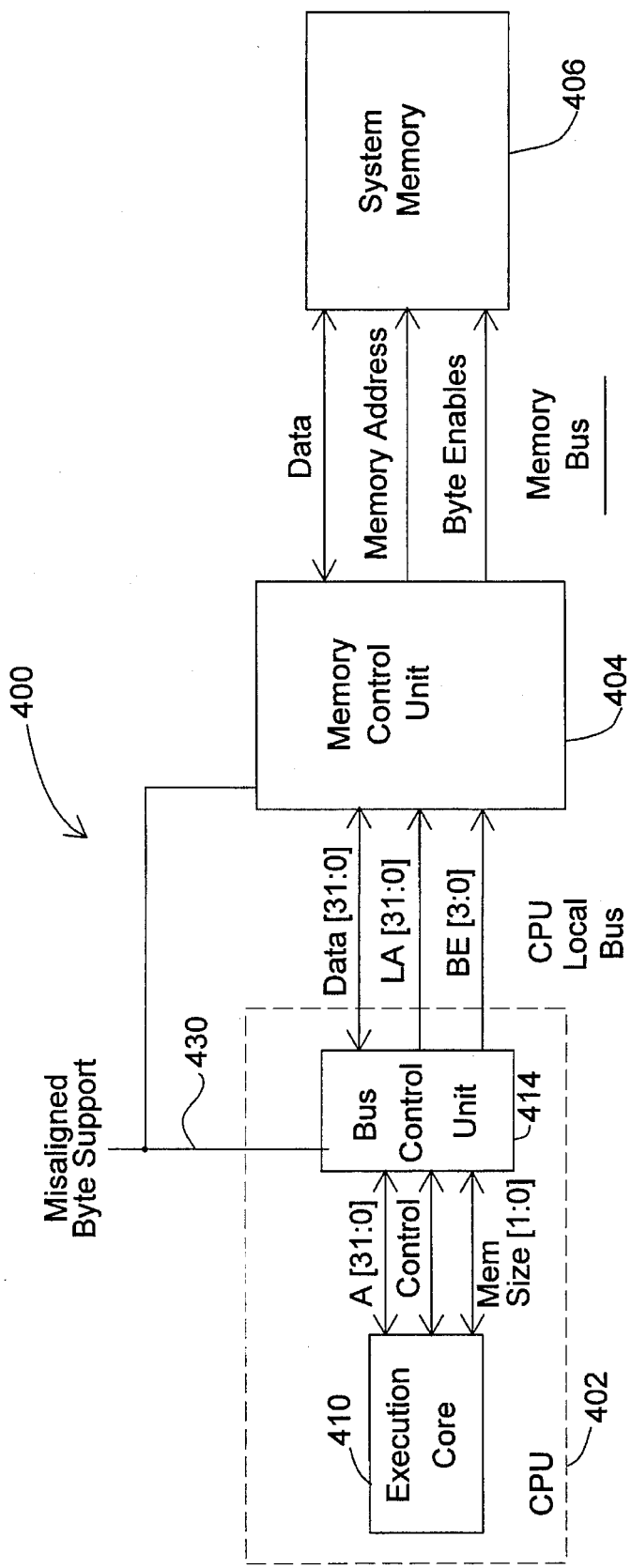
FIG. 3 is a block diagram of a computer system including a processing unit with a programmable byte-alignment mechanism according to the present invention.

Referring next to FIG. 3, a block diagram of a computer system 400 including a processing unit 402 having a programmable byte-alignment mechanism according to the present invention is shown. As illustrated in FIG. 3, a memory control unit 404 is coupled to processing unit 402 and a system memory 406. Processing unit 402 includes an execution core 410 coupled to a bus control unit 414. Execution core 410 is illustrative of, for example, a model 80486 microprocessor core. It is understood, however, the alternative execution cores could be provided.

For the embodiment of FIG. 3, processing unit 402 is configured to operate in two different modes of operation, depending upon a control signal labeled the "misaligned byte support" signal at line 430. If the misaligned byte support signal is deasserted high, the bus control unit 414 operates in accordance with a conventional model 80846 bus control unit. As such, bus control unit 414 parses memory accesses to misaligned memory addresses into separate memory cycles by driving the local bus address signal LA[31:2], the byte enable signals BE[3:0], and control signals in accordance with the conventional protocol as described previously. During these separate memory cycles, the lower two order bits LA[0] of the address signal are driven low and are essentially ignored by memory control unit 404. Thus, in this mode of operation, the local bus addressing signal LA[31:0] is only capable of specifying a doubleword location, while the byte enable signal BE[3:0] specifies the particular bytes of the addressed doubleword that are valid. Accordingly, to accomplish a memory access to a misaligned memory address, a pair of consecutive doubleword addresses must be driven on the addressing lines of the local bus during separate memory cycles.

If the misaligned byte support signal at line 430 is asserted low, bus control unit 414 generates a single memory cycle on misaligned addresses rather than generating two separate cycles, as described above. During this mode of operation, the bus control unit 414 drives the lower two order addressing bits of the local bus address signal LA[31:0] with a value that indicates the lowest byte to be accessed. The byte enable signals BE[3:0] are further driven to indicate the bytes relative to the byte specified by LA[31:0] that are valid.

Figure 4:
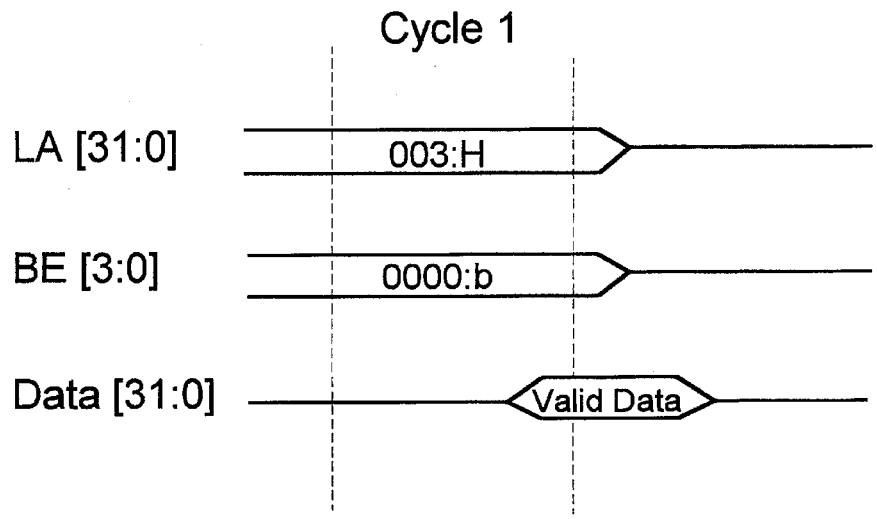
FIG. 4 is a signal diagram that illustrates an external bus cycle generated by the processing unit of FIG. 3 during execution of an instruction to a misaligned memory address.
Figure 5:
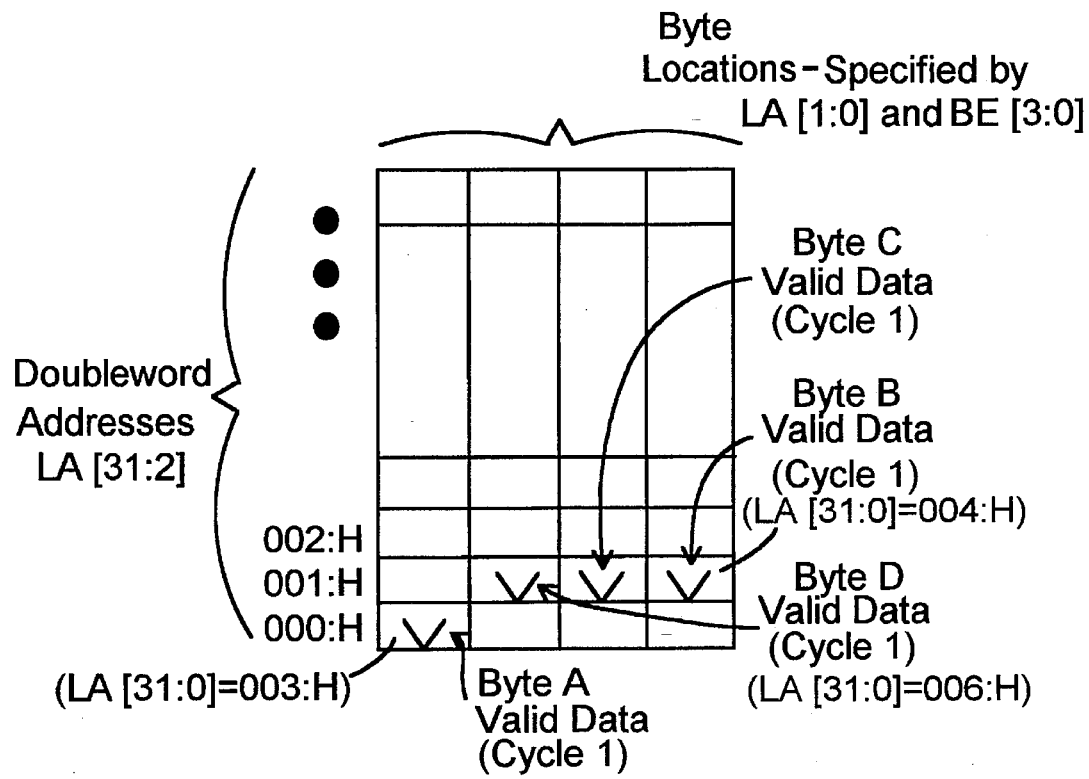
FIG. 5 is a diagram of a memory map which illustrates the writing of valid data during the cycle illustrated in FIG. 4.

For example, referring to FIG. 4, a timing diagram is illustrated for the situation in which execution core 410 encounters an instruction to write four bytes of data (Bytes "A", "B", "C", and "D") starting at the exemplary address A[31:0] =003:H. FIG. 5 is a memory map which illustrates the separately addressable byte locations of computer system 400. The bus control unit 414 executes the cycle by driving the address signal LA[31:0] with a value of 003:H. This indicates the doubleword to be transferred as well as the starting byte of the data to be transferred. The byte enable signal BE[3:0] is further driven with a value of 000:B. This indicates that four bytes of consecutive data starting with the addressed byte are involved in the transfer. The data (i.e., bytes "A", "B", "C", and "D") is then driven simultaneously on the data lines D[31:0] by bus control unit 414 to complete the cycle. This data is latched within memory control unit 404, which correspondingly drives the addressing lines and byte enable lines of system memory 406 to complete the requested transfer.

The address signal LA[31:0] thus points to a specific byte within the addressable memory of computer system 400, as opposed to simply a doubleword. The byte enable signals indicate the specific byte or bytes relative to the addressed byte that are involved in a particular transfer. Assertion of the misaligned byte support signal allows single cycle accesses to misaligned doubleword addresses, and thus accommodates a higher bandwidth on the local bus and a corresponding improvement in system performance.

The misaligned byte support signal may be provided to computer system 400 from an external source. Alternatively, the memory control unit 404 may be configured to control the assertion of the misaligned byte support signal depending upon the type of memory embodied within system memory 406. For example, if system memory 406 is comprised of dynamic random access memory, the memory control unit 404 may be configured to assert the misaligned byte support signal such that single cycle accesses to misaligned addresses are effectuated by bus control unit 414. It is noted that memory control unit 404 may further be configured to deassert the misaligned byte support signal at page boundary addresses such that two-cycle accesses are performed when a new DRAM page must be opened during the execution of a particular cycle. If system memory 406 is comprised of static random access memory, memory control unit 404 may be configured to either deassert the misaligned byte support signal such that two-cycle accesses to misaligned addresses are effectuated by bus control unit 414, or may be configured to assert the misaligned byte support signal and to parse the single cycle accesses from local bus into two-cycle accesses on the system memory bus.

The computer system described above may further employ the memory control techniques as disclosed within the copending, commonly assigned patent applications entitled "Non-Volatile Memory Array Controller Capable of Controlling Memory Banks Having Variable Bit Widths", by MacDonald, et al., filed Dec. 10, 1993, U.S. application Ser. No. 08/166,124; and "ROM Chip Enable Encoding Method and Computer System Employing the Same", by MacDonald, et al., filed Dec. 10, 1993, U.S. application Ser. No. 08/166,324. The above patent applications are incorporated herein by reference in their entirety.

Numerous variations and modifications will become apparent to those skilled in the art once the above disclosure is fully appreciated. For example, it is noted that system memory 406 may be comprised of any type of addressable memory or I/O device. It is intended that the following claims be interpreted to embrace all such variations and modifications.

What is claimed is:

1. A processing unit comprising:

an execution core configured to execute a predetermined instruction set; and a bus control unit coupled to said execution core, wherein said bus control unit is configured to generate an address signal, a byte enable signal, and at least one control signal for controlling a memory control unit, and wherein said bus control unit receives a misaligned byte support signal whereby said address signal specifies a doubleword address when said misaligned byte support signal is deasserted and wherein said address signal specifies a byte address when said misaligned byte support signal is asserted, whereby said bus control unit is configured to execute single cycle accesses to a misaligned doubleword address when said misaligned byte support signal is asserted.

2. The processing unit as recited in claim 1 wherein said bus control unit is configured to execute a two-cycle access to misaligned doubleword addresses when said misaligned byte support signal is deasserted.

3. The processing unit as recited in claim 1 wherein a doubleword comprises four bytes of data.

4. The processing unit as recited in claim 1 wherein said byte enable signal indicates which of a selected number of bytes associated with said address signal are enabled.

5. The processing unit as recited in claim 1 wherein said control signal is a read/write control signal.

6. The processing unit as recited in claim 1 wherein said byte enable signal is indicative of a number of valid bytes to be transferred during a designated memory cycle.

7. The processing unit as recited in claim 6 wherein said number of valid bytes transferred during said designated memory cycle is dependent upon said byte enable signal.

8. A processing unit comprising:

an execution core configured to execute a predetermined instruction set; and a bus control unit coupled to said execution core, wherein said bus control unit is configured to generate an address signal, a byte enable signal, and at lest one control signal for controlling a memory control unit, wherein a value of said address signal selectively identifies an individual byte location and wherein said byte enable signal is indicative of a number of valid bytes relative to said individual byte location that are enabled during a designated memory cycle.

9. The processing unit as recited in claim 8 wherein said bus control unit is further configured to receive a misaligned byte support signal whereby said addressing signal specifies a doubleword address when said misaligned byte support signal is deasserted and wherein said address signal specifies a byte address when said misaligned byte support signal is asserted.

10. The processing unit as recited in claim 9 wherein a doubleword comprises four bytes of data.

11. The processing unit as recited in claim 9 wherein said bus control unit is configured to execute single cycle accesses to a misaligned doubleword address when said misaligned byte support signal is asserted.

12. The processing unit as recited in claim 11 wherein said bus control unit is configured to execute a two-cycle access to misaligned doubleword addresses when said misaligned byte support signal is deasserted.

13. The processing unit as recited in claim 8 wherein said control signal is a read/write control signal.

14. A method for generating memory access cycles within a processing unit comprising the steps of:
   determining a byte address of a requested memory transfer;
   determining the number of bytes involved in said memory transfer;
   detecting a misaligned byte support signal; and
   if said misaligned byte support signal is deasserted, executing a two-cycle access to a misaligned doubleword address; or
   if said misaligned byte support signal is asserted, executing a single cycle access to a misaligned doubleword address.

15. The method as recited in claim 14 wherein said step of executing a two-cycle access to a misaligned doubleword address comprises the steps of:
   providing a first doubleword address on the local bus to indicate a first doubleword to be accessed;
   providing a byte enable signal that indicates the bytes of said first doubleword to be accessed during said first cycle;
   providing a second doubleword address indicating a second doubleword to be accessed; and
   driving said byte enable signal with a second value to indicate the bytes of said second doubleword.

16. A computer system comprising:
   an execution core configured to execute a predetermined instruction set;
   a bus control unit coupled to said execution core, wherein said bus control unit is configured to generate an address signal, a byte enable signal, and at least one control signal;
   a memory control unit coupled to said bus control unit;
   a misaligned byte support signal coupled to said bus control unit and said memory control unit; and
   a memory coupled to said memory control unit;
   wherein said memory control unit accesses data in said memory in response to said address, byte enable and control signals of said bus control unit, and transfers said data to said bus control unit; and
   wherein said address signal from said bus control unit specifies a byte address; and wherein a misaligned doubleword accessed from said memory is transferred from said memory control unit to said bus control unit in a single cycle when said misaligned byte support signal is asserted.

17. The computer system as recited in claim 16 wherein said address signal from said bus control unit specifies a doubleword address and said misaligned doubleword is transferred from said memory control unit to said bus control unit in at least two cycles when said misaligned byte support signal is deasserted.

18. The computer system as recited in claim 16 wherein a doubleword comprises four bytes of data.

19. The computer system as recited in claim 16 wherein said control signal is a read/write signal.

20. The computer system as recited in claim 16 wherein said byte enable signal is indicative of a number of valid bytes to be transferred during a designated memory cycle.

* * * * *